United States Patent

Irwin

[15] 3,688,671
[45] Sept. 5, 1972

[54] DOUBLE EXPOSURE MECHANISM FOR CAMERAS

[72] Inventor: George Irwin, 1747 Elmwood Drive, Highland Park, Ill. 60035

[22] Filed: Aug. 20, 1971

[21] Appl. No.: 173,474

[52] U.S. Cl. ..............................95/31 FL, 95/31 FM
[51] Int. Cl. .............................................G03b 19/04
[58] Field of Search ..95/31 FL, 31 AC, 53 R, 31 FM

[56] References Cited

UNITED STATES PATENTS

| | | | |
|---|---|---|---|
| 2,559,880 | 7/1951 | Kesel et al. | 95/31 |
| 2,721,506 | 10/1955 | Kindig et al. | 95/31 |
| 3,605,595 | 9/1971 | Irwin | 95/31 |

*Primary Examiner*—Samuel S. Matthews
*Assistant Examiner*—Michael L. Gellner
*Attorney*—McDougall, Hersh & Scott

[57] ABSTRACT

A camera construction including shutter means and holding means adapted to be moved into position for preventing operation of the shutter means each time the shutter moves thereby holding the shutter means against an additional operation until the film in the camera has been advanced to the next frame. The structure of the invention includes means for unlocking the holding means whereby a double exposure of a film frame can be accomplished. The unlocking means comprises a pressure applying arm having spring means normally urging the arm toward the holding means. The arm is retained out of engagement with the holding means until an actuating means positioned on the exterior of the camera housing is operated at which time the unlocking arm is driven against the holding means for displacing the holding means from a holding position with respect to the shutter means.

7 Claims, 8 Drawing Figures

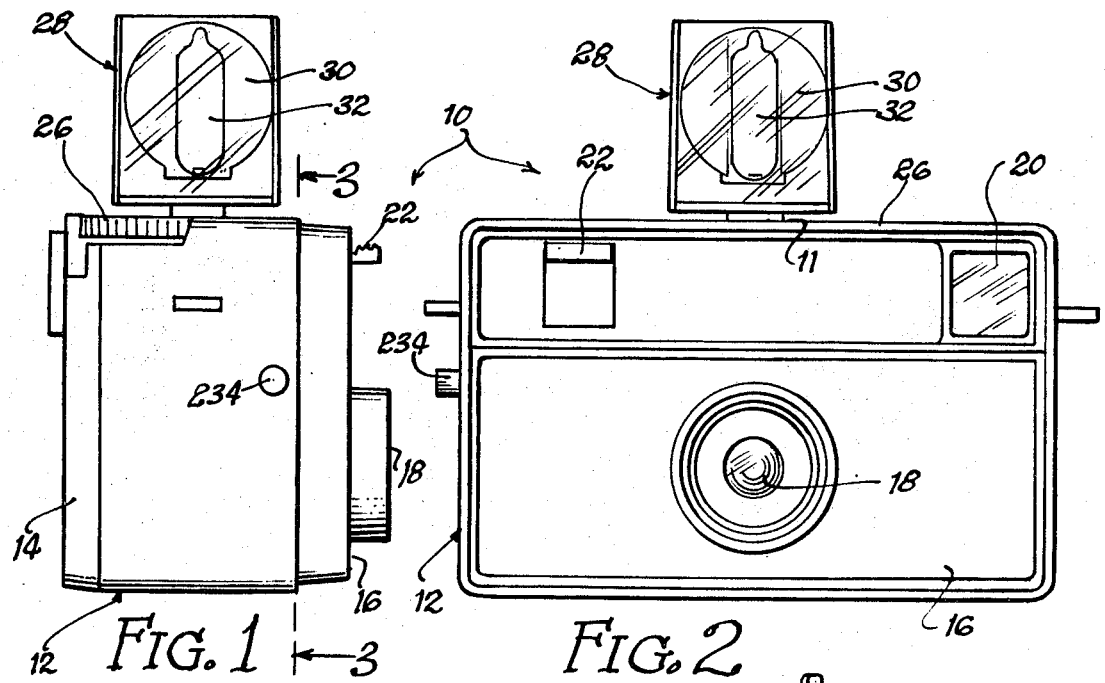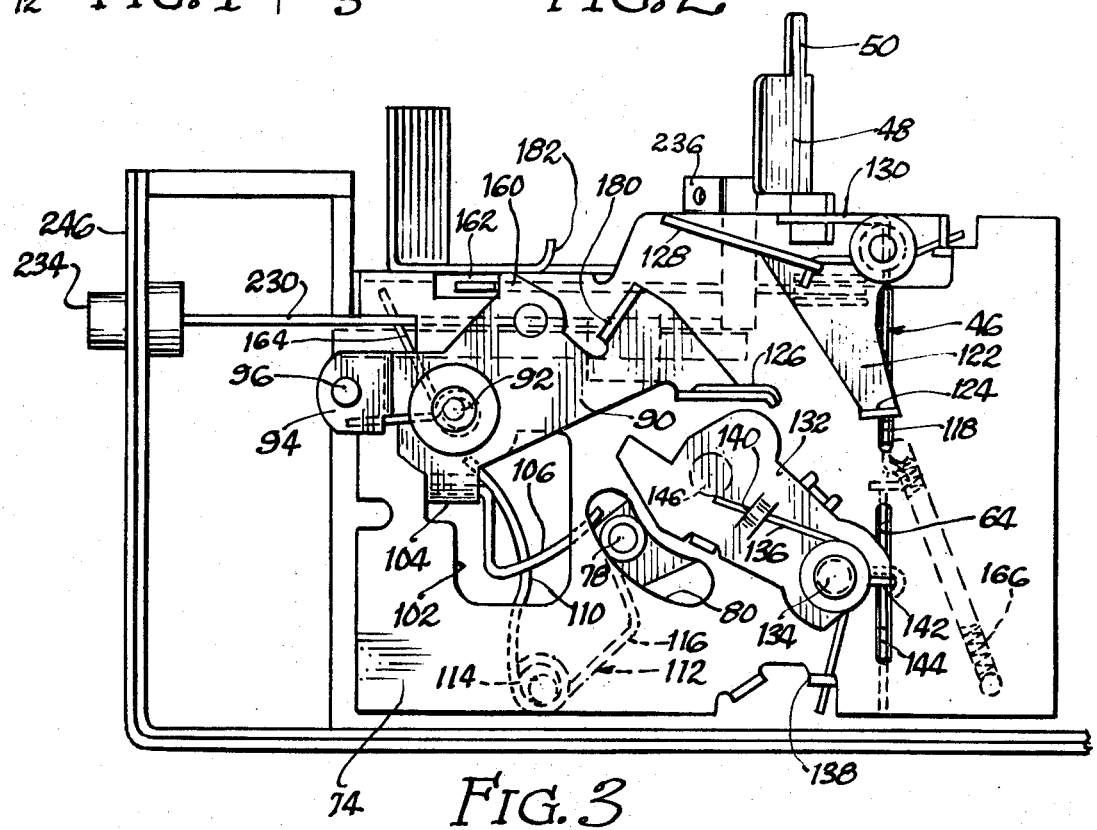

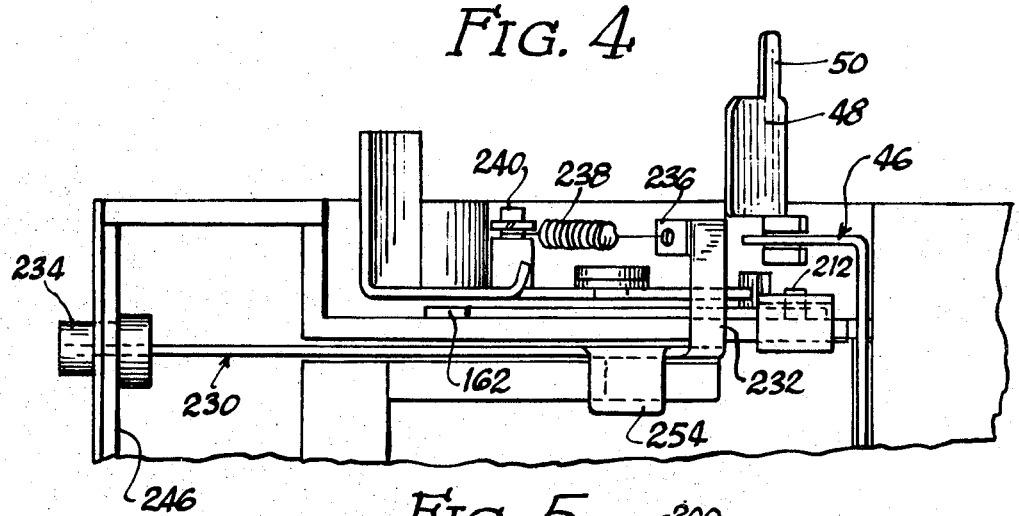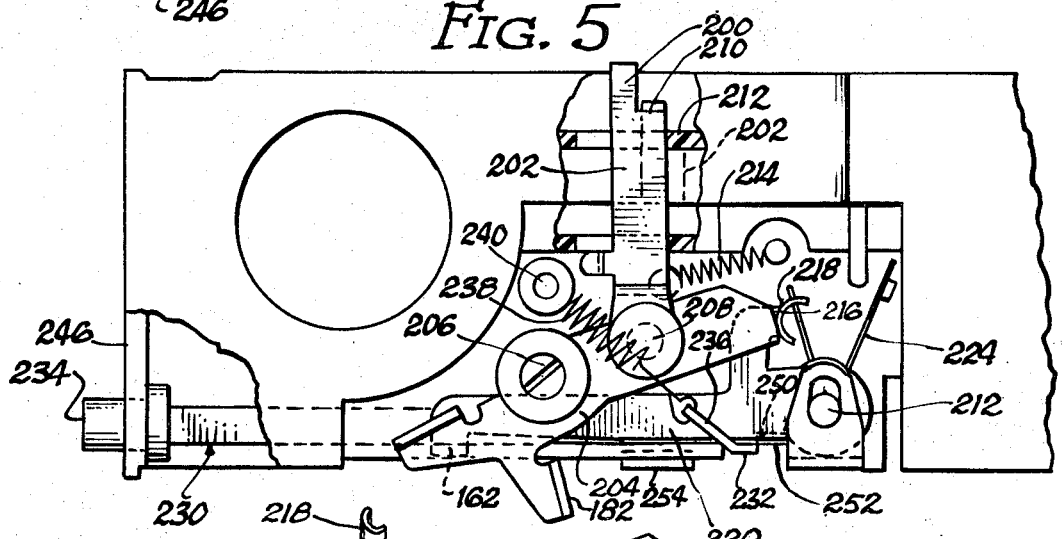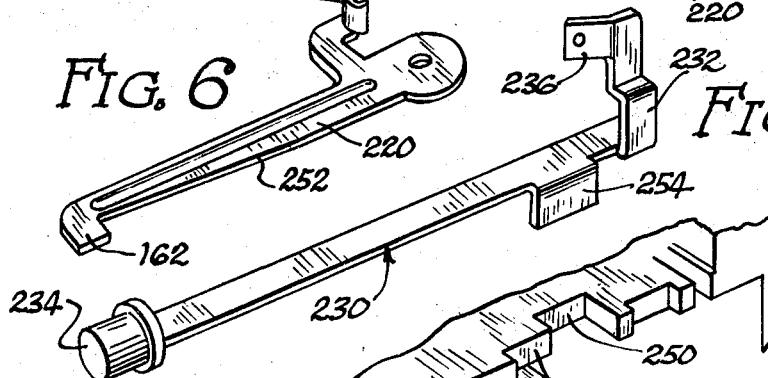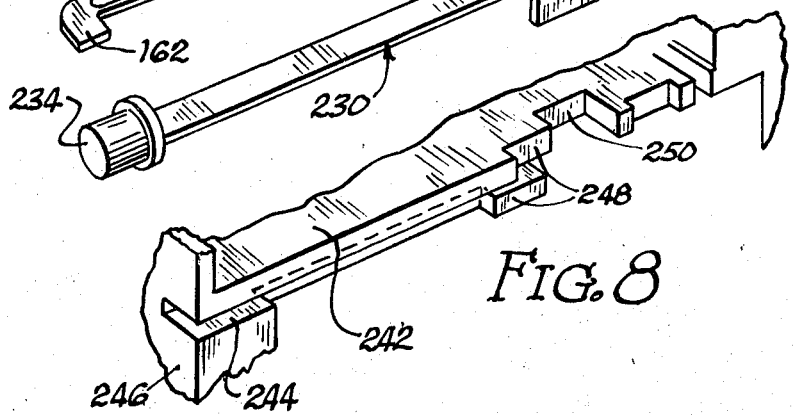

3,688,671

DOUBLE EXPOSURE MECHANISM FOR CAMERAS

This invention relates to a camera construction. The invention is particularly directed to a camera construction of the type having a safety mechanism for preventing double exposure of a film frame.

Cameras having double exposure preventing means have been widely accepted. Double exposures most often occur due to carelessness since a user of a camera will often expose a film frame for a second time, not realizing that the film was never advanced to the next frame. This, of course, leads to expense, annoyance and inconvenience. Because of the problems resulting from double exposure, various arrangements have been developed which will prevent the user of a camera from making a second exposure on a film frame. The majority of these arrangements provide for locking of the shutter mechanisms upon each actuation of the mechanisms. The shutter mechanisms can then only be unlocked after the film has been advanced to the next frame. These arrangements effectively eliminate the loss of a film frame due to an inadvertent double exposure.

The double exposure preventing mechanisms create other problems, however, since a deliberate double exposure cannot be achieved. Thus, more sophisticated camera users may desire a double exposure for artistic purposes. More often, a double exposure is desired where the user knows that the light to which the film was exposed on the first exposure was insufficient to produce a significant image on the film. This most often occurs where flash bulb assistance is desired and the bulb fails to fire.

It is a general object of this invention to provide an improved camera construction characterized by means for preventing inadvertent double exposures of a film frame while permitting a double exposure whenever the user of the camera so desires.

It is a more specific object of this invention to provide a mechanism for unlocking a double exposure preventing means in an extremely simple fashion whereby inadvertent double exposures will be avoided while deliberate double exposures can be easily accomplished.

These and other objects of this invention will appear hereinafter and for purposes of illustration, but not of limitation, specific embodiments of the invention are shown in the accompanying drawings in which:

FIG. 1 is a side elevational view of a camera construction of a type which can be modified to include the features of this invention;

FIG. 2 is a front elevational view of the camera construction;

FIG. 3 is an enlarged cross-sectional view of the camera construction taken about the line 3—3 of FIG. 1;

FIG. 4 is a fragmentary view of the mechanisms shown in FIG. 3 with the shutter structure removed;

FIG. 5 is a top plan view of the structure shown in FIG. 3;

FIG. 6 is a perspective view of the shutter holding means employed in the construction;

FIG. 7 is a perspective view of the arm employed as the unlocking means in the construction; and, FIG. 8 is a fragmentary perspective view illustrating the wall portion of the camera housing as adapted to receive the holding means.

The camera construction of this invention generally comprises a housing having shutter means normally covering a lens opening and adapted to be moved out of covering position for exposing a frame of film located in the construction. Means are provided for advancing the film after exposing of a film frame, and a holding means is included for preventing a double exposure of a film frame. These holding means are deactivated upon advancing of the film to the next frame.

The specific improvements of the invention comprise unlocking means for the holding means whereby the shutter means can be released to permit double exposure of a film frame. The unlocking means comprise a pressure applying element having associated spring means which normally urge the element toward the holding means for the shutter. A retaining means engages the pressure applying element to keep this element out of contact with the holding means until operation of an actuating means for the pressure applying element. This actuating means comprises a button or other member accessible from the outside of the camera housing. Operation of the actuating means serves to move the unlocking means away from the retaining means resulting in driving of the holding means out of its holding position. This action releases the shutter to permit a double exposure.

The drawings illustrate a camera construction 10 which is designed to incorporate the mechanisms of this invention. This construction comprises a housing 12 having a removable back wall 14. This removable wall provides access to the interior of the camera for insertion and removal of film.

The camera housing also defines a front wall 16 having a centrally located lens opening 18. A viewing window 20 is located in one corner of the front wall, and a shutter actuating button 22 is located in the corner opposite the viewing window.

A flash cube holding socket 11 is positioned on the top wall 26 of the housing. As illustrated in FIGS. 1 and 2, a flash cube 28 is adapted to be located in this socket. The flash cube 28 comprises a transparent outer shell 30, and four bulbs 32 are located within this shell. The camera illustrated is of the type described in Irwin application Ser. No. 92,568 and is designed for percussion type bulbs. It will be appreciated that battery operated cube or single bulbs, or cameras without built-in flash mechanisms, could be adapted to the concepts of this invention.

Where percussion type bulbs are used, the spring fingers thereof are engaged by means of a pusher rod structure 46 as described in the aforementioned copending application. This structure includes an upper engaging portion 48 having a narrow end 50 which is receivable within openings defined by the flash cube base. The spring fingers of the flash cube extend across these openings and are, therefore, engageable by the end 50 of the pusher rod. This action forces the fingers upwardly away from the restraining influence of detents in the cube and into contact with the percussion stems of flash bulbs.

The pusher rod defines an opening 64 which receives the end of a rocker element (now shown). The rocker carries a pin 78 which extends through an arcuate slot 80 defined by the interior camera wall 74.

Mounted on the front side of the wall 74 is a plate 90 pivotally movable about the axis 92. The plate defines an arm 94 carrying pin 96 which is engageable with a vertically extending bar formed integrally with the shutter button 22. Depression of the shutter button results in counterclockwise pivoting movement of the plate 90.

The wall 74 defines an opening 102, and an inturned portion 104 of the plate 90 extends through this opening. A spring engaging element 106 is secured to this portion 104 for pivotal movement with the plate 90. The element 106 defines a bifurcated end which receives the end 110 of spring member 112. This spring member extends around a post 114 with the other end 116 of the spring member being connected to the pin 78 carried by the rocker.

A pivotally mounted retaining element 122 defines a foot 124 which normally engages the tab 118 on the push rod structure. Accordingly, when the restraining element is in the position shown in FIG. 3, the push bar is restrained against vertical movement. During an initial stage of shutter actuation, therefore, the end 110 of the spring 112 is wound by the pivoting movement of the plate 90 while the end 116 of the spring is held stationary.

As the pivoting action of the plate 90 continues, the bearing element 126 of this plate eventually engages the bearing surface 128 defined by the retaining element 122. This causes pivoting of the retaining element in opposition to the action of spring 130. This pivoting action moves the foot 124 out of engagement with the tab 118 therefore freeing the push bar and associated rocker. The spring 112 then forces the push bar upwardly in opposition to restoring spring 166 which is a lighter spring.

In addition to engaging the firing finger of a flash bulb during upward movement, the push bar also operates to pivot the shutter plate 132 for achieving film exposure. This shutter plate is pivotally connected to the wall 74 at 134 and is normally held in the position shown in FIG. 6 by means of spring 136. One end of this spring is held by a tab 138 formed in the wall 74 while the other end is held by means of a tab 140 formed in the plate 132. A foot 142 is formed in the plate 132, and this foot is located in the path of a second outwardly extending tab 144 formed in the push rod member 56. Accordingly, when the push rod is released by the retaining element 122 and is driven upwardly by the action of rocker 70 and spring 112, the tab 144 will engage the foot 142 and thereby pivot the plate 132 in opposition to the spring 136. The pivoting movement of the plate 132 exposes the lens opening 146 which is normally blocked by this plate.

The illustrated camera is of the type utilizing a film cartridge which contains a length of film having apertures at intervals corresponding with film frames. In such cameras, a sensing finger 200 (FIG. 5) is positioned for engaging film in a cartridge. In the position of the finger shown in FIG. 5 in the solid line position of the finger illustrated, the camera is set for taking a picture. The picture taking action involves engagement of the bearing member 180 on plate 90 with the bearing portion 182 on the cam element 204. This cam element is pivotally attached at 206 to an intermediate horizontal wall portion of the camera. An arm 202 on which the finger 200 is formed is connected to the cam at 208.

Pivoting movement of the cam draws the arm 202 downwardly until the shoulder 210 on this arm becomes engaged behind the wall portion 212 as shown in dotted lines in FIG. 5. The spring 214 operates to move the arm 202 in this fashion.

The end 216 of the cam 204 engages a bearing surface 218 which is formed on a holding member 220. This holding member carries a blocking finger 162 and a spring 224 is provided for pivoting the holding member in a counterclockwise direction. This pivoting movement occurs during each shutter actuation when the cam 204 is driven out of engagement with the bearing surface 218 on the holding element 220. The pivoting action moves the finger 162 into the path of movement of an extension 160 formed on the plate 90. The plate 90 is restored to the position shown in FIG. 3 after a shutter actuation, and the plate is then prevented from further movement as long as the finger 162 is in the locking position.

In the normal camera operation, the finger 162 is moved out of blocking position when the film advancing means are operated to locate a subsequent film frame in picture taking position. Specifically, the sensing finger 200 will enter an aperture in the film as the film is advanced. Continued movement of the film will then pull the finger away from engagement with the wall portion 212 to thereby move the finger to the position shown in solid lines in FIG. 5. The cam 204 then drives against the bearing surface 218 thereby pivoting the holding element 220 to move the finger 162 out of blocking position.

In accordance with this invention, an unlocking mechanism is employed to enable movement of the finger 162 out of blocking position without requiring advancing to the next film frame. The unlocking mechanism comprises an elongated arm 230 having a pressure applying 232 at one end, and an actuating button 234 at the other end. A tab 236 is formed on the extension 232, and a spring 238 is attached at one end to this tab. The other end of the spring is attached to a post 240 secured to a stationary post 240. The structures illustrated are mounted on an intermediate wall 242 of the camera housing. This wall is slotted at 244 for receiving the arm 230. The actuating button 234 extends through an opening in side wall 246.

The extension 232 is normally positioned for engagement with the surfaces 248 defined by the wall 242. When the button 234 is pushed in opposition to the action of spring 238, the arm 230 shifts from left to right whereby the extension 232 moves into a notched area 250.

The extension 232 serves as a pressure applying element with respect to the holding element 220. Thus, the edge 252 of the element 220 will extend into the notched area when the finger 162 is in the blocking position. The pressure applied by the extension 232 will thus serve to drive the holding element 220 to an unblocking position. By selecting the springs 224 and 238 so that the latter spring will over power the former, the unlocking of the holding element 220 can be either efficiently accomplished.

The unlocking element 230 also includes a downwardly extending tab 254 which fits behind the plate 90. The combination of this tab and the plate 90 serves to maintain the position of the unlocking arm.

Thus, the spring 238 tends to pivot the arm about its axis and the plate 90 operates to overcome this tendency.

The unlocking arm 230 serves as a convenient means for providing double exposure of a film frame. The double exposure may be desired to achieve a particular photographic effect; however, the feature is most desirable where there was insufficient light during the first exposure. It is well known that flash bulbs are subject to occasional failure, and with flash cube cameras, there is a tendency to locate a burned out bulb in the picture taking position. Inadequate exposure of a film frame can occur relatively often, and this invention provides a very convenient means for saving the film frame.

It will be understood that various changes and modifications may be made in the above described construction which provide the characteristics of this invention without departing from the spirit thereof.

That which is claimed is:

1. In a camera construction including a housing, shutter means normally covering a lens opening and adapted to be moved out of covering position for exposing a frame of film located in the construction, means for advancing the film after exposing of a film frame, and holding means adapted to be moved into position upon exposing of a film frame for holding the shutter means against movement until advancing of the film to the next frame, the improvement comprising unlocking means for the holding means whereby shutter means can be released to permit double exposure of a film frame, said unlocking means comprising a pressure applying element, spring means normally urging said element toward said holding means, a retaining means for engaging said pressure applying element to hold the pressure applying element out of contact with said holding means, and an actuating means for said pressure applying element, said actuating means being accessible from outside the camera housing and operating to move said pressure applying element away from said retaining means whereby said pressure applying element moves against the holding means to drive the holding means out of position with respect to said shutter.

2. A construction in accordance with claim 1 including an elongated sliding arm, said pressure applying element comprising an extension formed on said arm, and said actuating means comprising a manually engageable button positioned on the exterior of said housing.

3. A construction in accordance with claim 2 wherein said retaining means comprises a wall portion of said housing, a notch defined in said wall portion, said extension on said arm normally bearing against said wall portion in response to the action of said spring means, the engagement of said button displacing said arm to move said extension into said notch for thereby driving said extension against said holding means.

4. A construction in accordance with claim 3 wherein said holding means comprises a pivotally mounted member having a finger adapted to be inserted in the path of movement of said shutter means, second spring means normally urging said pivotally mounted member into holding position relative to said shutter means, said extension on said arm driving said pivotally mounted member out of holding position in opposition to the action of said second spring means.

5. A construction in accordance with claim 4 including a pivotally mounted cam member engageable by said shutter means during exposure of a film frame, said cam member contacting said extension on said arm upon double exposure of a film frame to move said extension out of said notch, the spring means attached to said arm returning said extension into bearing relationship with said wall portion whereby said pivotally mounted member is freed from engagement with said extension for repositioning of the pivotally mounted member in holding position with respect to said shutter means.

6. A construction in accordance with claim 5 wherein said film is of the type having perforations, a finger engageable with said perforations, said pivotally mounted cam member being connected to said finger, engagement of said cam member by said shutter means operating to withdraw said finger from a perforation upon actuation of the shutter means, and wherein engagement of the finger by the next perforation in the film operates to move said holding means out of holding position with respect to said shutter means.

7. A construction in accordance with claim 6 wherein said shutter means includes a plate member movable adjacent said arm and a second extension formed on said arm and bearing against said plate member, said plate member thereby maintaining the position of said arm within said housing.

* * * * *